Patented Dec. 30, 1930

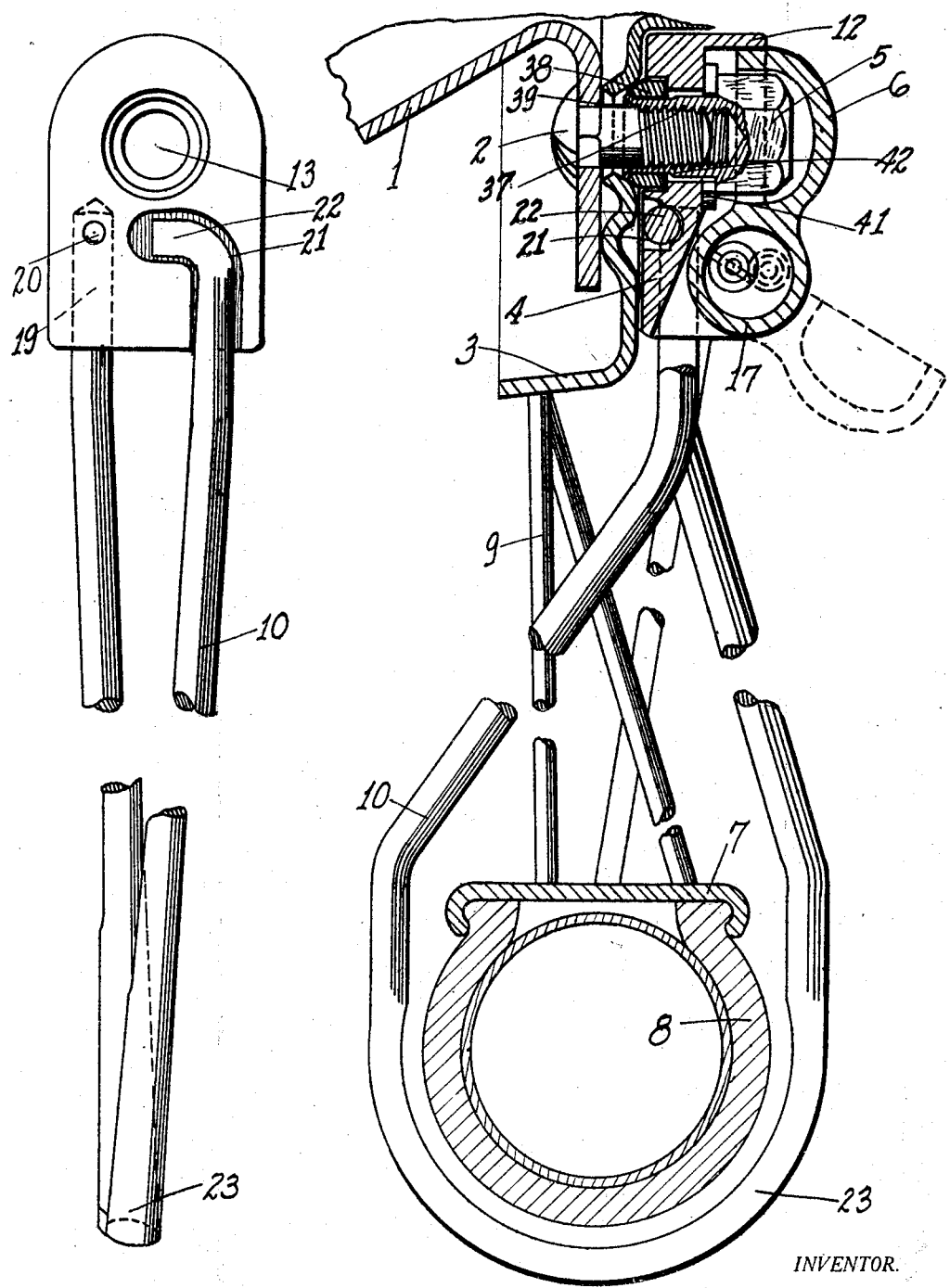

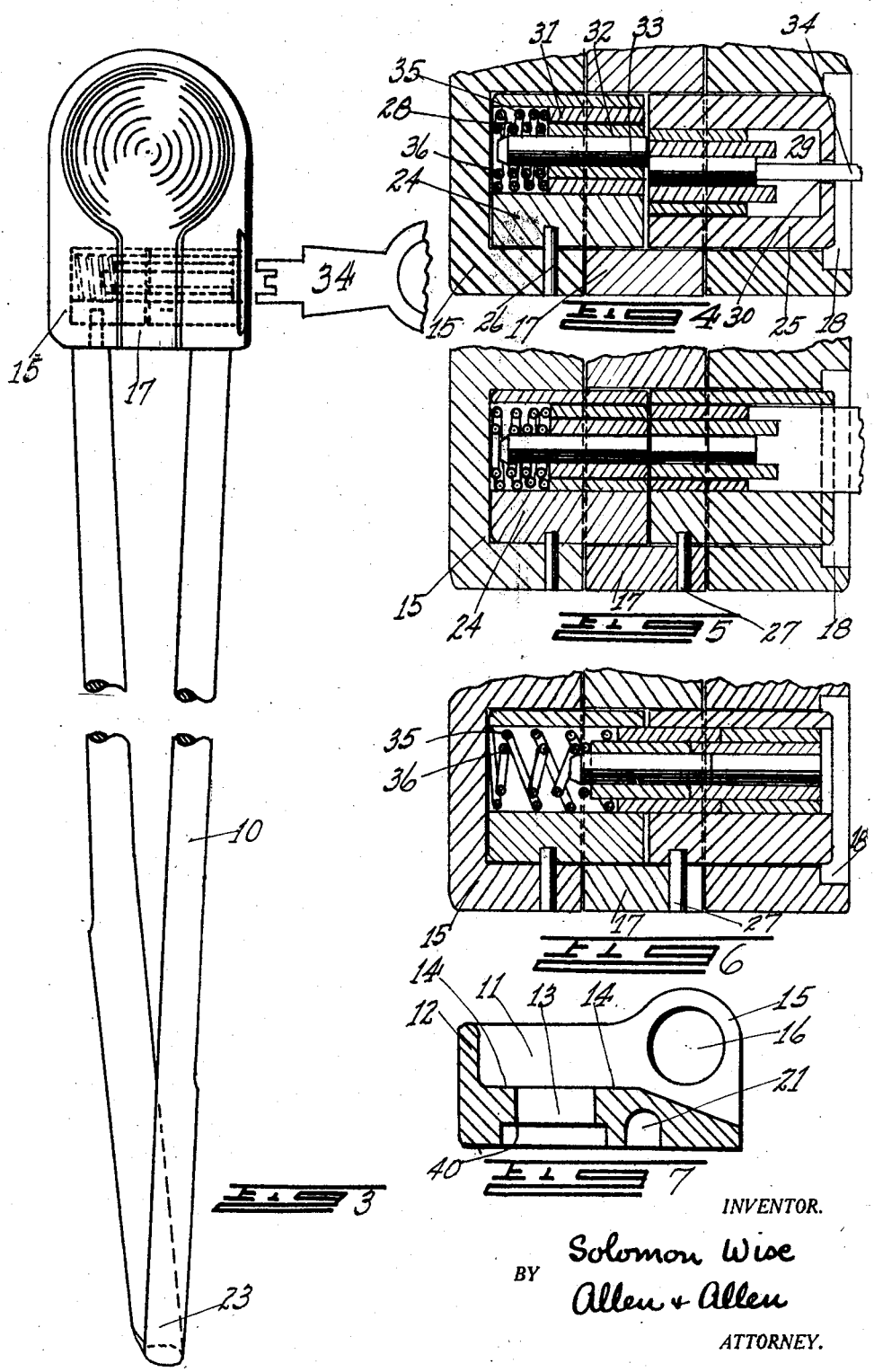

1,787,134

UNITED STATES PATENT OFFICE

SOLOMON WISE, OF CINCINNATI, OHIO

LOCKING DEVICE FOR AUTOMOTIVE EQUIPMENT

Application filed May 22, 1928. Serial No. 279,690.

My invention relates to devices for locking a nut upon a bolt, and is of the type in which a locked cover prevents access to the bolt. It has particular application, though useful elsewhere, to automotive equipment in which a spare wheel and tire is mounted upon a carrier and held in place by nuts upon bolts attached to the carrier and passing through the hub flange. The spare wheels and carrier on Ford cars are of this type, and I shall describe my invention in the ensuing specification with particular reference to equipment like the Ford equipment, it being understood that it is applicable to other equipment without change, or with such changes as are within the purview of one skilled in the art without departing from the spirit of my invention.

Hitherto in equipment of this class, a plurality of bolts affixed to the carrier extend through the hub flange and have nuts upon them, one of these nuts being in the form of a locking lug with a hole therein to accommodate the hasp of a padlock or other device to prevent the rotation thereof. This is accomplished by using a locking device of such size that it will strike the hub of the wheel, or some other fixed portion, if the nut be turned. Aside from the inherent disadvantages in such a locking scheme, it will be seen that, alone, it does not secure the spare tire to the rim, though it may prevent the removal of the spare wheel.

It is an object of my invention to provide a lock which will replace the lug-nut and padlock, and which will comprise a nut member and a locking cover for preventing access thereto. It has as another object the provision of a member, which is a part of the lock, to encircle the tire and lock it also to the car.
Still another object is the provision of these devices, comprising broadly the lock proper, the nut, and the encircling band, in a unitary and inseparable structure to prevent the inconvenience of handling many parts and the danger of losing them. Further objects have to do with the neatness and handsome appearance of my lock, the simplicity of its operation, the ruggedness of its construction, and the economy of its manufacture. These and other objects which will be apparent to one reading these specifications, I accomplish by that certain construction and arrangement of parts of which I shall now describe a preferred embodiment, and which I shall hereinafter claim, reference being made to the drawings which form a part of these specifications.

In the drawings:—

Figure 1 is a partial section through a spare wheel and tire upon a carrier, and shows my lock, also in section, installed upon the carrier-bolt.

Figure 2 is a rear elevation of my lock and band, showing the engagement of the releasable leg of the band with the lock.

Figure 3 is a front elevation of the lock and band.

Figures 4, 5, and 6 are sections taken through the barrel portion of my lock, and showing it respectively unlocked, ready for unlocking, and locked.

Figure 7 is a central section through the body plate of my lock.

In Figure 1 I have shown in section part of a carrier 1 which may be thought of as attached to the frame of a car. This carrier bears a carrier-bolt 2 which is adapted to extend through a hole in the hub flange 3 of a spare wheel. Since the drawing is a section of but part of a wheel and rim, the hub proper is not shown therein. It will be quite clear, however, that a nut screwed down against the hub flange 3 upon the carrier bolt 2 will rigidly secure the spare wheel to the carrier. I provide a locking substitute for this nut, comprising generally a body plate 4 which is perforated to receive the bolt 2, a nut 5 to be screwed upon the bolt, and a hinged locking cover 6 adapted to swing up over and prevent access to the nut. I have shown also in Figure 1 a rim 7 bearing a tire 8, and joined to the hub, as will be readily understood, by spokes 9. In order to lock the spare tire also, I provide as a part of my lock an encircling band 10 which passes completely about the tire and is locked as will hereinafter be described. These are the general features of my device.

I shall now describe in detail its various parts and their functioning.

The base or body plate 4 is shown in section more clearly in Figure 7 where the other parts have been removed, and is shown in rear elevation in Figure 2, and in front elevation in Figure 3 where it is associated with the locking cover. It is hollowed out on top to form a cup shaped orifice for the nut and cover, which orifice is surrounded by the lip 12. The floor of the orifice is perforated by the hole 13 through which the carrier-bolt 2 is to pass, and the diameter of this hole is sufficiently smaller than the diameter of the floor of the cup-shaped orifice to leave a portion of the floor 14 to serve as a bearing for the nut 5. The back face of the body plate is made of such shape as will conform generally to the adjacent hub flange surface, though, as hereinafter explained, I do not tighten the body plate against the hub flange.

I form a rounded barrel-like section 15 in my base plate next the cup-shaped orifice and extending more or less tangentially to the periphery thereof. This barrel section is given a bore 16 beginning at one end, but not extending through the other. This construction is very clearly shown in Figures 4, 5 and 6, and is indicated in dotted lines in Figure 3. Intermediate the ends of the barrel section it is slotted to receive a corresponding section of the locking cover, similarly bored. This construction is also clearly shown in the several figures in which I have indicated the cooperating section of the locking cover by the numeral 17. It will be evident that if a cylindrical part were inserted in the bore 16 and through the member 17, the locking cover would be hinged to the body plate and could swing through an arc with reference thereto. In assembling my device I place within this bore a mechanism which serves the combined function of hinging the locking cover to the base plate and of locking the cover in a closed position thereon, as I shall hereinafter describe. The open end of the bore may have an enlarged section 18. (Figs. 4, 5 and 6.)

Opposite the barrel section I prefer to round off my body plate to conform to the circular outline of the cup-shaped orifice; and I prefer also, to enhance the appearance of my lock, to round off all edges and corners. The exact configuration of the base plate may, however, be infinitely varied. So long as its construction comprises generally a body with an orifice to accommodate the bolt, and a barrel section for the pivoting and locking of the cover, it may externally be shaped into different designs for different users. The cup-shaped orifice may be deep or shallow as desired, or omitted altogether, as by the elimination of the lip 12.

Reference to Figure 2 will show that, for the attachment of the band 10, I provide beneath the barrel section a bore 19 into which one leg of the band is inserted and held, as by a non-removable pin 20. Other means of fastening are, however, satisfactory. The other leg of the band is removably held in an orifice in the body plate so that when the lock is in place upon a spare wheel it cannot be removed therefrom, because the hub-flange closes the orifice. A number of configurations of parts will permit this, one of them being an under-cut orifice and a straight leg of the band. I prefer, however, to form an L-shaped orifice 21 in the body plate, which is open through the back face thereof, and to form an L-bend 22 in the leg of the band. This construction prevents the opening of the band by a pull in the direction of the axis of the leg. The band itself I prefer to make of hardened steel wire so that it may not be sawed or cut. I shape it so as to completely encircle the tire and rim as clearly shown in Figure 1. To decrease its stiffness in the portion which must be flexed in spreading the legs of the band to remove my device from the wheel and tire, I may flatten the band in a direction radial to the tire in that portion which surrounds the tire as shown at 23, when my band is otherwise circular in cross-section.

The lock mechanism, Figs. 4, 5 and 6, forming also the means lying within the bore of the barrel section whereby the lock cover is pivoted to the body plate, comprises two cylindrical metal sections lying within the bore 16. I have designated these sections respectively 24 and 25, 24 being the innermost section and lying within that end of the bore 16 which is closed. The length of these sections is so proportioned that their meeting line will lie within and approximately in the center of the section 17 of the lock cover. By means of a non-removable pin 26 or otherwise, I pin the plug 24 to the closed end of the barrel section in such a way that it cannot rotate therein. Similarly by means of the pin 27 I fasten the plug 25 to the lock cover in such a way that it must rotate therewith. My reason for using the two plugs rather than a single plug in the barrel section is that my locking mechanism is preferably of a character to prevent the relative rotation of two plugs, and while it would be possible to utilize the same kind of a lock with one plug, using as the other plug an unbored portion of the barrel section, that construction would not give me such strength in the hinging of the lock cover to the body plate as I now secure. In one aspect of my invention, however, I am not restricted to any particular locking means for maintaining a locked relationship between the body plate and the lock cover when the latter is closed, but other types of locking devices than the one I shall describe as preferred may be used with equal facility, and will require merely such changes in the barrel section and pivots as such other locking mechanisms necessitate, all of which changes are within the broad aspect of my invention.

The preferred locking means which I use comprises an eccentric bore through the two plugs, and means within this bore possessing a line of cleavage such that under the action of a key this line of cleavage may be caused to coincide with the line of cleavage between the two plugs whereupon, as will be quite clear, the two plugs can rotate relative to each other on a common axis, though relatively to the body plate, one plug is fixed; and the lock cover may rotate relatively to the body plate. It will be noted, particularly in Figure 4, that whereas the plug 24 possesses an eccentric bore 28 extending entirely through it, the corresponding eccentric bore 29 does not extend entirely through the plug 25 but is closed at one end, and through this closure a key slot 30 is made. Consequently when the lock is once assembled the tumblers cannot be withdrawn from the plugs. My preferred locking device comprises a series of concentric tubular plungers which I have indicated in Figure 4 as 31 and 32, but which may vary in number according to the desire of the lock maker. In ordinary practice I have found that two such plungers with a central rod member 33 are satisfactory and give a lock which is very difficult to pick. The tumblers, as shown, possess a line of cleavage which, under the action of a key 34, may be caused to coincide with the division line between the two plugs, as is clearly shown both in Figures 4 and 5. Springs 35 and 36 actuate the plungers so that when the key is withdrawn and the lock cover is in the closed position bringing the bore of the plugs into alignment, the tumblers will be driven forward until they stop against the key slot, as is very clearly shown in Figure 6. One advantage of my type of lock is its extreme simplicity of construction and the economy of its manufacture. In the present instance it enables me to make a type of lock in which the key operating to unlock the device upon its insertion in the key slot, may also be used to open the lock by swinging the lock cover relative to the body plate. This will be clearly understood when it is remembered that the key operating in the key slot 30 of the plug 25 cannot be turned without rotating the plug, and since the plug is firmly fixed to the lock cover by the pin 27 the rotation of the plug will produce the desired swinging of the lock cover. The type of concentric tubular plunger mechanism for locks which I prefer to use in this invention I have described and claimed in my Patent No. 1,390,222, issued September 6, 1921.

My lock as now described would be operable with a separate nut to screw on the bolt which, during the use of my lock, passes through the hole 13, it being readily understood and quite clear from the drawings that the lock cover has attached to its section 17 a cup like section which fits down over the nut and effectually prevents access thereto when my lock is locked. It will be noticed also in Figure 1 that I prefer a construction of the lock cover such that the edges of the cup-shaped portion thereof, when the cover is in closed position, will lie within the cup-shaped orifice 11 of the body plate, presenting an appearance from the front such as is shown in Figure 3. This particular construction prevents the insertion of a tool beneath the cup portion of the lock cover and the use of this tool upon the body plate as a fulcrum to break the lock. I thus have an interlocking cup arrangement which not only enables me to produce a very handsome lock but also increases the theft-proof character of the device and its ruggedness.

I prefer, however, not to use with my device a separable nut, but to fasten the nut rotatably into my device so that the car owner is in no danger of losing it and is not put to the inconvenience of placing my lock in position, and as a separate operation screwing a nut on the bolt. In order to accomplish this object I provide the nut 5, as shown in Figure 1, with a threaded projecting sleeve 37 extending through the hole 13 and terminating in a somewhat narrower portion therebeyond. When this sleeve is inserted through the hole 13 I place a bearing washer 38 and then I flange the open end of the sleeve portion over this washer so as to hold it in place, although the washer 38 is free to slide on sleeve 37, as is shown at 39. Reference to Figure 7 will show that I provide the hole 13 with an enlargment forming a shoulder 40 against which the washer 38 can operate and it will now be clear that the washer holds the nut revolvably in place on my body plate so that I have no separable nut to be looked after by the operator. I prefer also to provide the nut 5 with a washer 41 (Figure 1) overlying the bearing surface 14. This washer, if desired, may be made integral with the nut.

Figure 1 shows the configuration of the hub flange of a wheel adjacent the hole in the flange through which the carrier bolt extends. It will be noted that about this hole there is a depression. I shape my washer 38 so as partially to enter this depression and to bear against the sides thereof. Thus the operation of my device in practice is as follows:—the nut, being screwed down tight, operates against the body plate to cause it to bear upon the washer 38, and this washer bears against the depression in the hub flange round about the hole to accommodate the carrier bolt. The cooperating parts are preferably so proportioned that my lock will be held under moderate pressure between the washer 38 and the washer 41. It will now be seen that the body plate of my lock, being thus separately held, may not and preferably does not bear against the hub-flange, but is separated threfrom by a very slight distance, though sufficient to prevent the lock from scratching the hub plate.

Having thus described my invention, what I claim as new and desire to secure by Letters Patent, is:—

1. A locking device comprising a body plate perforated to receive a bolt, said body plate enlarged at one side to form a barrel section containing a bore, said barrel section cut out intermediate its ends, a lock cover member having a corresponding barrel section and bore, mounted in said cut out portion, a locking device in said bore whereby said lock cover may be swung about said bore as a pivot and may be locked in a position relative to said base plate, said lock cover comprising a member adapted when in closed position to cover and prevent access to a nut screwed upon said bolt.

2. A locking device comprising a body plate perforated to receive a bolt, said body plate enlarged at one side to form a barrel section containing a bore, said barrel section cut out intermediate its ends, a lock cover member having a corresponding barrel section and bore, mounted in said cut out portion, a locking device in said bore whereby said lock cover may be swung about said bore as a pivot and may be locked in a position relative to said base plate, said lock cover comprising a member adapted when in closed position to cover and prevent access to a nut screwed upon said bolt, and a substantially U-shaped band affixed by one leg to said body plate, said body plate containing an orifice to receive the other leg of said band.

3. A locking device comprising a body plate perforated to receive a bolt, said body plate enlarged at one side to form a barrel section containing a bore, said barrel section cut out intermediate its ends, a lock cover member having a corresponding barrel section and bore, mounted in said cut out portion, a locking device in said bore whereby said lock cover may be swung about said bore as a pivot and may be locked in a position relative to said base plate, said lock cover comprising a member adapted when in closed position to cover and prevent access to a nut screwed upon said bolt, and a substantially U-shaped band affixed by one leg to said body plate, said body plate containing an orifice to receive the other leg of said band, said orifice opening to the rear of said body plate whereby the abutment of said body plate against a member through which said bolt passes will prevent removal of said leg.

4. A locking device comprising a body plate perforated to receive a bolt and a locking cover pivoted on said body plate to prevent access when closed to a nut screwed on said bolt, and a substantially U-shaped member attached by one leg to said body plate, and means for holding said other leg to said body member, said means comprising an L-shaped orifice open through the back of said body plate, and an L-bend on the end of said leg.

5. In a locking device a body plate with an orifice to receive a bolt, a bearing surface about said orifice for a nut, a raised lip forming a cup about said bearing surface, a lock-cover pivoted on said body plate and having a cup-shaped portion adapted to cover said bolt, said cup-shaped portion of said lock-cover fitting in closed positon substantially within said cup, and means for locking said lock-cover.

6. In a locking device a body member with a bore therein forming a barrel section, said barrel section slotted intermediate its ends, a locking member with a corresponding barrel section located within said slot, a divided plug in said composite barrel section whereby said locking member is pivoted on said body member, one part of said divided plug fastened to said body member against removal and rotation, the other part of said plug fastened to said locking member, and means for locking the parts of said divided plug against rotation relative to each other.

7. In a locking device a body member with a bore therein forming a barrel section, said barrel section slotted intermediate its ends, a locking member with a corresponding barrel section located within said slot, a divided plug in said composite barrel section whereby said locking member is pivoted on said body member, one part of said divided plug fastened to said body member against removal and rotation, the other part of said plug fastened to said locking member, and means for locking the parts of said divided plug against rotation relative to each other, said means comprising a common eccentric bore in said plug parts, and spring-pressed concentric tubular plungers in said bore, said plungers having a line of cleavage which can be made by means of a key to coincide with the division line between said plug parts.

8. In a locking device a body plate perforated to receive a bolt, a nut for said bolt, means for revolvably mounting said nut on said body plate, said means comprising a shank on said nut extending through said perforation and means on said shank to prevent withdrawal thereof, a lock cover pivoted on said body plate to prevent access to said nut when closed, and means to lock said lock cover in fixed position on said body plate.

9. A locking device comprising a body plate perforated to receive a bolt, a bearing surface about said perforation, a nut revolvably mounted to exert pressure on said bearing surface, said body plate enlarged at one side to form a barrel section with a bore therein, said barrel section slotted intermediate its ends, a lock cover comprising a cover for said nut and a barrel section, said second barrel section mounted within the slot in said first barrel section, and locking means in the bore of said composite barrel section whereby said lock cover is pivoted upon said body plate and whereby it may be locked there against.

10. A locking device comprising a body plate perforated to receive a bolt, a bearing surface about said perforation, a nut revolvably mounted to exert pressure on said bearing surface, said body plate enlarged at one side to form a barrel section with a bore therein, said barrel section slotted intermediate its ends, a lock cover comprising a cover for said nut and a barrel section, said second barrel section mounted within the slot in said first barrel section, and locking means in the bore of said composite barrel section whereby said lock cover is pivoted upon said body plate and whereby it may be locked there against, said locking means comprising a divided plug one portion of which is fastened to said body plate and the other portion of which is fastened to said lock cover, and means for locking said plug portions against relative rotation.

11. In a locking device, a body member provided with an orifice adapted to receive the end of a bolt, a cover member having a cup-shaped portion which is adapted to cover the end of said bolt, cooperating means upon the body portion and the cover having aligned openings, and a locking member occupying the said openings and providing a pivotal mounting for the cover member upon the said body.

12. A locking device comprising a body plate perforated to receive a bolt, a bearing surface about said perforation, a nut revolvably mounted to exert pressure on said bearing surface, said body plate enlarged at one side to form a barrel section with a bore therein, said barrel section slotted intermediate its ends, a lock cover comprising a cover for said nut and a barrel section, said second barrel section mounted within the slot in said first barrel section, and locking means in the bore of said composite barrel section whereby said lock cover is pivoted upon said body plate and whereby it may be locked there against, said locking means comprising a divided plug one portion of which is fastened to said body plate and the other portion of which is fastened to said lock cover, and means for locking said plug portions against relative rotation, said means comprising a common eccentric bore in said plug parts and spring pressed concentric tubular plungers in said bore, said plungers having a line of cleavage which by means of a key may be caused to coincide with the division line between said plug parts.

13. A locking device comprising a body plate perforated to receive a bolt, a bearing surface about said perforation, a nut revolvably mounted to exert pressure on said bearing surface, said body plate enlarged at one side to form a barrel section with a bore therein, said barrel section slotted intermediate its ends, a lock cover comprising a cover for said nut and a barrel section, said second barrel section mounted within the slot in said first barrel section, and locking means in the bore of said composite barrel section whereby said lock cover is pivoted upon said body plate and whereby it may be locked there against, said locking means comprising a divided plug one portion of which is fastened to said body plate and the other portion of which is fastened to said lock cover, and means for locking said plug portions against relative rotation, said beans comprising a common eccentric bore in said plug parts and spring pressed concentric tubular plungers in said bore, said plungers having a line of cleavage which by means of a key may be caused to coincide with the division line between said plug parts, and a substantially U-shaped member attached by one leg to said body plate and means for holding the other leg in engagement with said body plate, a raised lip surrounding said bearing surface and forming thereabout a cup-shaped section of substantial depth, said cover comprising an inverted cup-shaped section of substantial depth, said sections adapted, when the lock cover is in closed position to fit one within the other.

SOLOMON WISE.